US006973504B2

(12) United States Patent
Nomura

(10) Patent No.: US 6,973,504 B2
(45) Date of Patent: Dec. 6, 2005

(54) METHOD FOR ALLOCATING NETWORK AGGREGATION BANDWIDTH AND A NETWORK SYSTEM USING THE SAME

(75) Inventor: Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 652 days.

(21) Appl. No.: 09/815,551

(22) Filed: Mar. 22, 2001

(65) Prior Publication Data

US 2002/0103924 A1 Aug. 1, 2002

(30) Foreign Application Priority Data

Nov. 2, 2000 (JP) .............................. 2000-335925

(51) Int. Cl.$^7$ ............................................. G06F 15/16
(52) U.S. Cl. ...................... 709/235; 709/229; 709/232; 370/230; 370/230.1; 370/231; 370/232; 370/233; 370/234; 370/237; 725/96; 379/112.05
(58) Field of Search ................................ 709/229, 232, 709/235; 370/395.41, 395.31, 235, 229, 230, 370/230.1, 231, 232, 233, 234, 237; 379/112.05; 725/96

(56) References Cited

U.S. PATENT DOCUMENTS

| | | | | |
|---|---|---|---|---|
| 6,078,953 | A | * | 6/2000 | Vaid et al. .................. 709/223 |
| 6,092,113 | A | * | 7/2000 | Maeshima et al. .......... 709/230 |
| 6,456,630 | B1 | * | 9/2002 | Packer et al. ................ 370/466 |
| 6,466,979 | B1 | * | 10/2002 | Plouffe, Jr. ................. 709/226 |
| 6,529,499 | B1 | * | 3/2003 | Doshi et al. ................ 370/352 |
| 6,628,670 | B1 | * | 9/2003 | Galand et al. .............. 370/468 |
| 2003/0219030 | A1 | * | 11/2003 | Gubbi ......................... 370/442 |

FOREIGN PATENT DOCUMENTS

JP          10-070566          3/1998

OTHER PUBLICATIONS

Resource allocation for elastic traffic: architecture and mechanisms. Wang, Z.; Basu, A.; Network Operations and Management Symposium, 2000. NOMS 2000. 2000 IEEE/IFIP, Apr. 10-14, 2000 pp. 157-170.*
Multiprotocol Label Switching Architecture, Internet Draft. Rosen, E, Viswanathan, A., Callon, R., Aug. 1999. pp. 21-25.*
Dynamic Routing of Locally Restorable Bandwidth using Aggregated Link Usage Information. Kodialam, M. and Lakshaman, 20th Annual Joint Conference of the IEEE Computer and Communications Societies. Proceedings. IEEE, vol. 1. pp 376-385.*

* cited by examiner

Primary Examiner—John Follansbee
Assistant Examiner—Ashok B. Patel
(74) Attorney, Agent, or Firm—Katten Muchin Rosenman LLP

(57) ABSTRACT

A method and a system using the method enabling to decrease required resource for the bandwidth reservation in an inter-site connection network used for communication between communication sites. The aggregation of bandwidth is considered for allocating bandwidth in the inter-site connection network. The network consists of a plurality of nodes each having a packet switch, and a plurality of user sites each constituted by a host or an internal network respectively connected to the plurality of nodes via access lines. With respect to the plurality of user sites, when one user site is to be connected to the other site through the network, a necessary and sufficient bandwidth for interconnecting between the user site and the other is calculated according to the bandwidth of the access line connecting the user site to the network considered as a minimal bandwidth. Based on the calculated result, the bandwidth is allocated to the plurality of nodes.

9 Claims, 8 Drawing Sheets

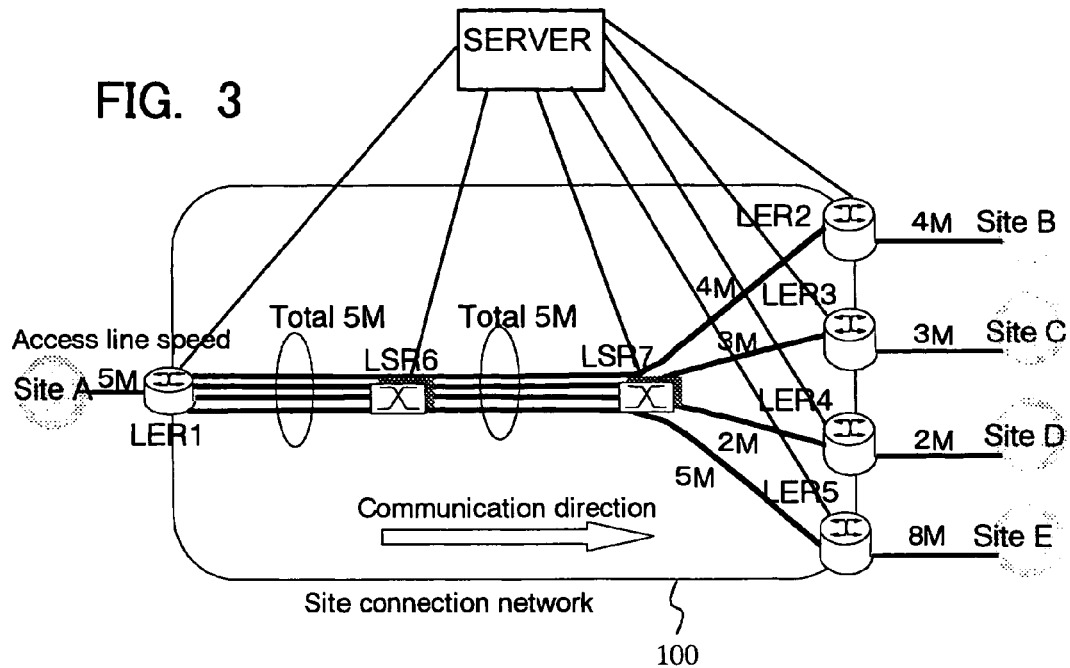

Path management table after setting paths between sites A & B

| Aggregation Path ID | Aggregation bandwidth | Group ID | Originating site | Originating bandwidth | Destination site | Destination bandwidth |
|---|---|---|---|---|---|---|
| 0001 | 4M | G-1 | A | 5M | B | 4M |
|  |  |  |  |  |  |  |

FIG. 4B

Path management table after setting paths between sites A & C

|  | Aggregation Path ID | Aggregation bandwidth | Group ID | Originating site | Originating bandwidth | Destination site | Destination bandwidth |
|---|---|---|---|---|---|---|---|
| a | 0001 | 5M | G-1 | A | 5M | B | 4M |
| b | 0001 | 5M | G-1 | A | 5M | C | 3M |
|  |  |  |  |  |  |  |  |

FIG. 8

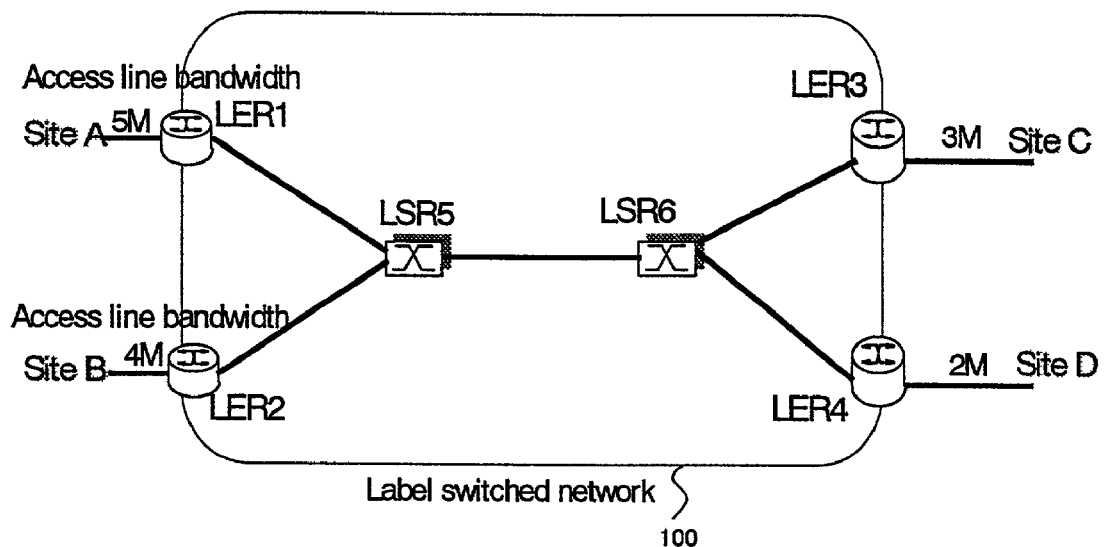

FIG. 9A

Path management table after setting paths between sites A & C, D

|   | Aggregation Path ID | Aggregation bandwidth | Group ID | Originating site | Originating bandwidth | Destination site | Destination bandwidth |
|---|---|---|---|---|---|---|---|
| a | 0001 | 5M | G-1 | A | 5M | C | 3M |
| b | 0001 | 5M | G-1 | A | 5M | D | 2M |

FIG. 9B

Path management table after setting paths between sites B & C

|   | Aggregation Path ID | Aggregation bandwidth | Group ID | Originating site | Originating bandwidth | Destination site | Destination bandwidth |
|---|---|---|---|---|---|---|---|
| a | 0001 | 3M | G-1 | A | 5M | C | 3M |
| b | 0002 | 2M | G-1 | A | 5M | D | 2M |
| c | 0001 | 3M | G-1 | B | 4M | C | 3M |

METHOD FOR ALLOCATING NETWORK AGGREGATION BANDWIDTH AND A NETWORK SYSTEM USING THE SAME

FIELD OF THE INVENTION

The present invention relates to a method for allocating shared bandwidth in a packet switch using IP (Internet protocol), MPLS (multi protocol label switching) or the like, and a network system using the method.

BACKGROUND OF THE INVENTION

In an MPLS network or an IP network consisting of an ingress node, an egress node and a transit node interconnected by links, a bandwidth reservation function is adopted using RSVP (resource reservation protocol).

In such a network, when a bandwidth is to be reserved on a communication route from an ingress point to an egress point, the same bandwidth is reserved on a link by link basis using a bandwidth reservation protocol. Such a communication route on which a bandwidth is reserved is hereafter referred to as a "path".

In the conventional method, a bandwidth is determined during path establishment procedure. A bandwidth reservation protocol is used for transmitting a message containing a requested bandwidth information to-and-fro between an ingress node and an egress node. When a plurality of paths are to be established, bandwidth is allocated on a path basis.

In a conventional method, when communication is to be started by reserving a bandwidth between communication sites, a fixed bandwidth is established independently on a path basis. Accordingly, there is established a path having a maximum bandwidth to be used from an ingress node connecting an originating site to an egress node connecting a destination site.

In FIG. 1, a network configuration is shown for explaining a conventional problem, in which a path is to be established for communication from a site A to a plurality of sites B, C, D and E. A bandwidth of a path required for communicating between sites can be considered as follows.

There exists an upper limit value of an available bandwidth, which is determined by such factors as link speed of an access line for connecting a site and the network, gateway capacity, and server capacity. As an example, a bandwidth of an access line connecting a site to the network becomes the upper limit of the bandwidth.

Therefore, a smaller bandwidth out of bandwidths of access lines on either an originating site or a destination site is a necessary and sufficient bandwidth for the communication between the sites. Communication may occur substantially simultaneously from site A to each site B, C, D and E, each requesting a path bandwidth. The network is required to provide bandwidth for each path.

More specifically, in the example shown in FIG. 1, the respective required bandwidths are 4 Mbps for connecting site A to site B; 3 Mbps for site A to site C; 2 Mbps for site A to site D; and 5 Mbps for site A to site E which is limited by a bandwidth of the originating site.

In case of interconnection between a plurality of sites in FIG. 1, fully mesh-structured paths are required, where each required bandwidth be reserved on each site for possible use, which is totally 14 Mbps in this case. This is apparently inefficient because required bandwidth resources increase with the squared number of sites.

SUMMARY OF THE INVENTION

It is an object of the present invention to provide a method and a network system using the same method to solve the aforementioned problem in the conventional method that required network bandwidth resources increase with the squared number of sites.

More specifically, in a packet-based VPN (virtual private network) using a protocol such as IP and MPLS for interconnecting communication sites consisting of a host or an internal network belonging to a certain group such as a company, etc., it is an object of the present invention to provide a method for calculating a necessary and sufficient link bandwidth to share available bandwidth of which upper limit is determined by such factors as a link speed of each access line for connecting each site to the network, gateway capability and server capability, and to provide a method and a network system using the method for controlling network bandwidth based on the calculated result.

In order to attain the above objects, a method and a network system using the method are proposed in the present invention based on a concept of shared bandwidth allocation determined when establishing a path between sites. The shared bandwidth (or aggregation bandwidth) is reserved for a plurality of paths, instead of individual bandwidth resource reserved on a path by path basis.

For this purpose, it is required to obtain a necessary and sufficient bandwidth to be reserved by a plurality of paths, and to obtain the plurality of paths which can be aggregated. More specifically, a transit node is required to obtain an upper limit value of an available bandwidth and the paths sharing this upper limit bandwidth. Here, the upper limit value is determined by such factors as link speed of an access line for connecting a site to a network, gateway capability, server capability, etc.

To satisfy the above requirement and solve the conventional problem, a method for allocating network aggregation bandwidth and a network system using this method is provided for a network system comprising; an inter-site connection network consisting of a plurality of nodes respectively having packet switches; and a plurality of user sites respectively consisting of a host or a network connected to said plurality of nodes through access lines.

When a user site of interest among said plurality of user sites is to be connected to the other site through said inter-site connection network, a bandwidth of an access line connecting the user site of interest to the network is determined as a minimum bandwidth. Then a necessary and sufficient bandwidth for interconnecting the user site of interest to the other user site is calculated, and a bandwidth is allocated to the plurality of nodes based on the calculated bandwidth.

As a preferred embodiment of a method for allocating network aggregation bandwidth, and a network system using this method, according to the invention to solve the aforementioned problem, if a plurality of paths possible to aggregate exist among paths for interconnecting said plurality of user sites, paths are aggregated with respect to a user site of interest having an allocatable bandwidth smaller than a second user site.

Further, as another preferred embodiment of a method for allocating network aggregation bandwidth, and a network system using this method, according to the invention to solve the aforementioned problem, when a virtual site having a host or a gateway to another network used a user site of interest is connected to said inter-site connection network, bandwidth allocation is set based on the virtual site regarded as the user site of interest.

Still further, as another preferred embodiment of a method for allocating network aggregation bandwidth, and a network system using this method, according to the invention to solve the aforementioned problem, when said user site of interest becomes not existent a path related thereto is deleted, and whether the aggregation for other paths having the same aggregation path ID as the deleted path has been constructed at the destination site or the originating site is investigated. If the aggregation has not been constructed, a new aggregation relation is established among paths having either the same destination site or the same originating site; else if the aggregation has been constructed at either the destination site or originating site having a larger site bandwidth, then the existing aggregation relation is canceled to obtain a new aggregation bandwidth based on a site having a smaller bandwidth.

Still further, as another preferred embodiment of a method for allocating network aggregation bandwidth and a network system using this method, when an access line bandwidth is changed to make an aggregation bandwidth different from either the destination or originating bandwidth, or produce inverted interrelation in the bandwidth size between the destination bandwidth and the originating bandwidth, an aggregation path and an aggregation bandwidth are newly obtained.

Still further, as another preferred embodiment of a method for allocating network aggregation bandwidth and a network system using this method, a server is provided in said inter-site connection network, and the server calculates the aggregation path and the aggregation bandwidth. When bandwidth resource possible to reserve exists in the inter-site connection network, the server transmits to each transit node an indication information of an aggregation path included in a bandwidth allocation message to be transmitted in forward or backward direction.

Still further, as another preferred embodiment of a method for allocating network aggregation bandwidth and a network system using this method, the server specifies a transit node or transit nodes through which the bandwidth allocation message is transferred.

Further scopes and features of the present invention will become more apparent by the following description of the embodiments with the accompanied drawings.

BRIEF DESCRIPTION OF THE DRAWINGS

FIG. 3 shows a first embodiment according to the resolution principle of the present invention.

FIGS. 4A and 4B show contents of path management table corresponding to an operation shown in FIG. 3.

FIG. 8 shows an example of a network configuration for illustrating a second embodiment of the present invention.

FIGS. 9A and 9B show examples of path establishment registered in a management table corresponding to the second embodiment of the invention.

DETAILED DESCRIPTION OF THE PREFERRED EMBODIMENTS

The preferred embodiments of the present invention are described hereinafter referring to the charts and drawings, wherein like numerals or symbols refer to like parts. However, the description of the embodiments is not intended to limit the invention to the particular details of the examples illustrated.

Now, before explaining the present invention, the resolution principle of the invention is described hereafter for the sake of understanding.

Figure 1:
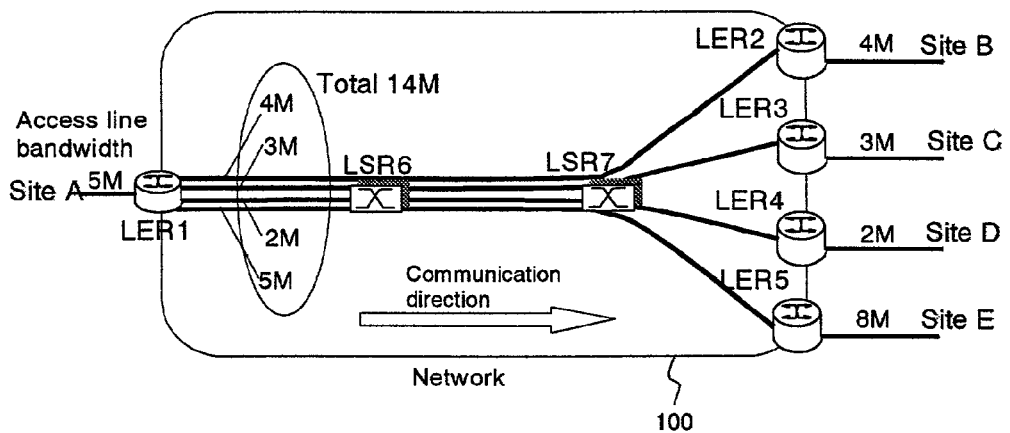
FIG. 1 shows an example of network configuration for illustrating a conventional problem.

As a basic recognition of the present invention, it is to be understood that a plurality of sites A to E shown in FIG. 1 include access lines each having an upper limit on a bandwidth for connecting to a network 100. In other words, when a site communicates with different n sites, a total bandwidth does not exceed an upper limit of an access line bandwidth.

More specifically, in case an originating site has n destination sites for communication, and a link having aggregated paths oriented to n sites exists, the maximum bandwidth of traffic to be transmitted on the link is limited to an upper limit of the access line bandwidth of the originating site.

Therefore, the resolution principle of the present invention is that each transit node recognizes this upper limit of bandwidth as well as paths to be aggregated, to ensure bandwidth according to an aggregation bandwidth for a plurality of paths. With this principle, bandwidth allocation for each path between the sites can be avoided. Thus an effect to reduce bandwidth necessary for connection between the sites can be attained.

Figure 2:
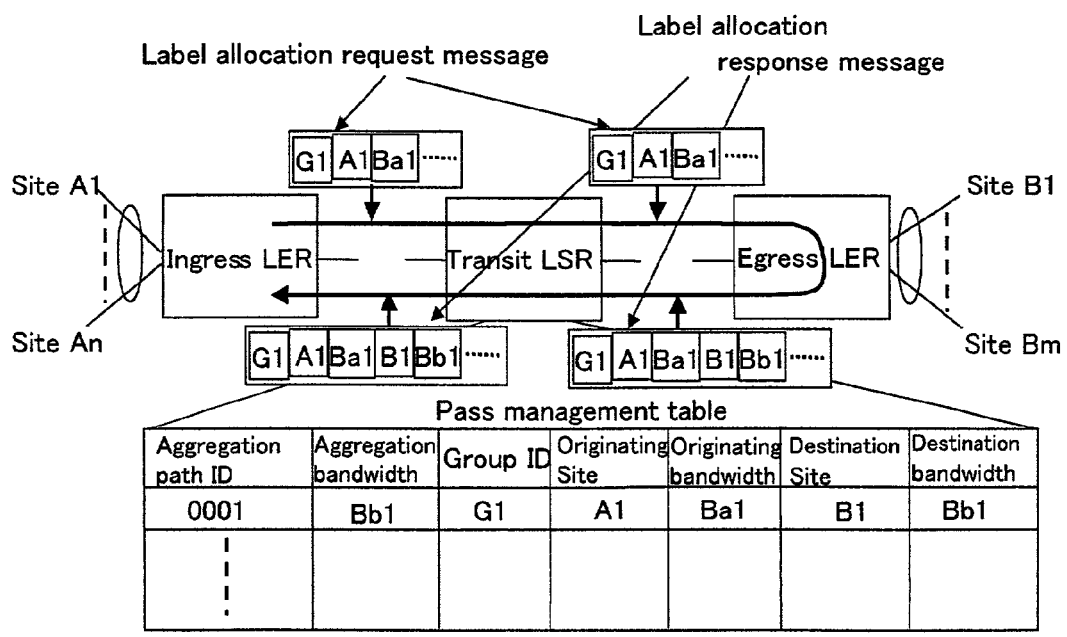
FIG. 2 shows a principle of the present invention.

As a method for realizing this principle, as shown in FIG. 2, there is provided information necessary for path establishment in a label allocation request message in label allocation protocol. The information includes identifiers (IDs) of an originating site and destination site, access line bandwidths, and a group ID indicating paths to be aggregated. In an example shown in FIG. 2, A1 and B1 denote the site IDs, G1 denotes a group ID, and Ba1 and Bb1 denote bandwidths of access lines of the sites.

In each node through which a message is transferred, a bandwidth is allocated for a plurality of paths. Or, otherwise, a server commonly provided in a network transmits a bandwidth allocation message. This message has a function of indicating to each node an aggregated path and its aggregated bandwidth, from an originating site, as an entry, to a destination site through transit nodes.

For this purpose, either each node or the above-mentioned server is constituted so as to provide the following functions:

A) In the ingress node (LER1; LER denotes label edge router.), an access line bandwidth of 5 Mbps provided in an originating site (hereinafter referred to as originating bandwidth) is recognized; B) In each egress node (LER 2 to 5), an access line bandwidth of 4 Mbps, 3 Mbps, 2 Mbps and 8 Mbps respectively provided in each destination node (hereafter referred to as destination bandwidth) is recognized; C) Information on the originating and destination bandwidth is transferred through a label allocation protocol, to be added into a path management table. Using information included in the existing path management table and the label allocation protocol, a bandwidth is calculated for a plurality of paths (aggregated paths) to allocate to a corresponding link.

Using these functions, each node decides its aggregation bandwidth according to the following processes:

When a label allocation message for a new path is received on a node, the smaller amount of bandwidth of the originating bandwidth and the destination bandwidth in respective access lines is selected. The obtained bandwidth is defined as a path request bandwidth.

A path having the same ID of either the originating site or the destination site is retrieved out of the existing paths belonging to the same group ID. When the same ID is found, the sum of the bandwidth acquired in the existing aggregated path (referred to as aggregation bandwidth) and the path request bandwidth is obtained.

Then a path having either the same originating site ID or the destination site ID is searched. If the originating site ID is found, the above-mentioned sum is compared to the originating site bandwidth, or else if the destination site ID is found, the above-mentioned sum is compared to the destination site bandwidth. In either case, the smaller of bandwidth is defined as a new aggregation bandwidth. Then a new path is set into the path management table and the aggregation bandwidth is updated.

In FIG. 3, there is shown an embodiment of the present invention according to the resolution principle described above. In this case, it is assumed that each user site A to E has an access line of upper limit speed 5 Mbps, 4 Mbps, 3 Mbps, 2 Mbps and 8 Mbps, respectively, connected to an MPLS label switched network 100.

In FIGS. 4A and 4B, there is shown contents of the path management table corresponding to the operation shown in FIG. 3. This table is located either in respective transit node LSR6 and 7, or in non-illustrated server commonly provided in label switched network 100.

In an embodiment shown in FIG. 3, a case is assumed that only a single site is an originating site and a plurality of sites are destination sites, or, on the contrary, a plurality of sites are originating sites and only a single site is a destination site.

In addition, the upper limit of speed is normally determined by an access line bandwidth, but may also be determined either by the upper limit of speed of gateway equipment or a server implemented in a site. This is also applicable in other embodiments illustrated below.

Now, site A is connected to an edge node LER (label edge router) 1 in a label switched network 100 with an access line bandwidth of 5 Mbps. Similarly, each site B to E is connected to the network with the above mentioned bandwidth.

A label switched network 100 consists of LERs 2 to 5 located as edge nodes and a LSRs (label switch routers) 6 and 7. It is assumed that LDP (label distribution protocol) is used for establishing MPLS path (LSP: label switched path).

It is also assumed that the setting of LSP for connecting a path from site A to sites B, C, D, and E begins with a path from site A to site B.

[Path Establishment from Site A to Site B]

For establishing a path from site A to site B, a label allocation protocol such as LDP is transmitted. Prior to this transmission, however, the following information is given to LER1: the group ID of site A to site E of "G-1", the data of line bandwidth of site A connected to LER1 of "5 Mbps", and the identifier of site A of "A".

The above information is obtained when a network usage contract is made between the customer i.e. the owner of site A and the provider of label switched network 100, and is set into LER1. Also for LER2 to LER5, which respectively connect sites B to E, the similar procedure is made.

Now, when the connection between site A and site B is started, an LDP message is transmitted from LER1 to LER2. In this message, the group ID of "G-1", the originating site ID of "A" and the originating bandwidth of "5 Mbps" are stored among information given in advance for site A.

The LDP message arrives in LER2 through LSR6 and LSR7. Then LER2 transmits a return message back to LER1, so that a label to be used in each LSR is determined.

Here, in LER2, information of the group ID for site B of "G-1" indicating the group of site A to E, the line bandwidth of site B connected to LER2 "4 Mbps" and the ID for site B of "B" is stored in the LDP message, similar to LER1, for transmission.

At this time, LSR7 allocates a bandwidth for a link from LSR7 to LSR2. The bandwidth allocation is carried out by a procedure commonly applicable to any node, which is illustrated in a bandwidth allocation procedure shown in the operational flow in FIG. 5.

Figure 5:
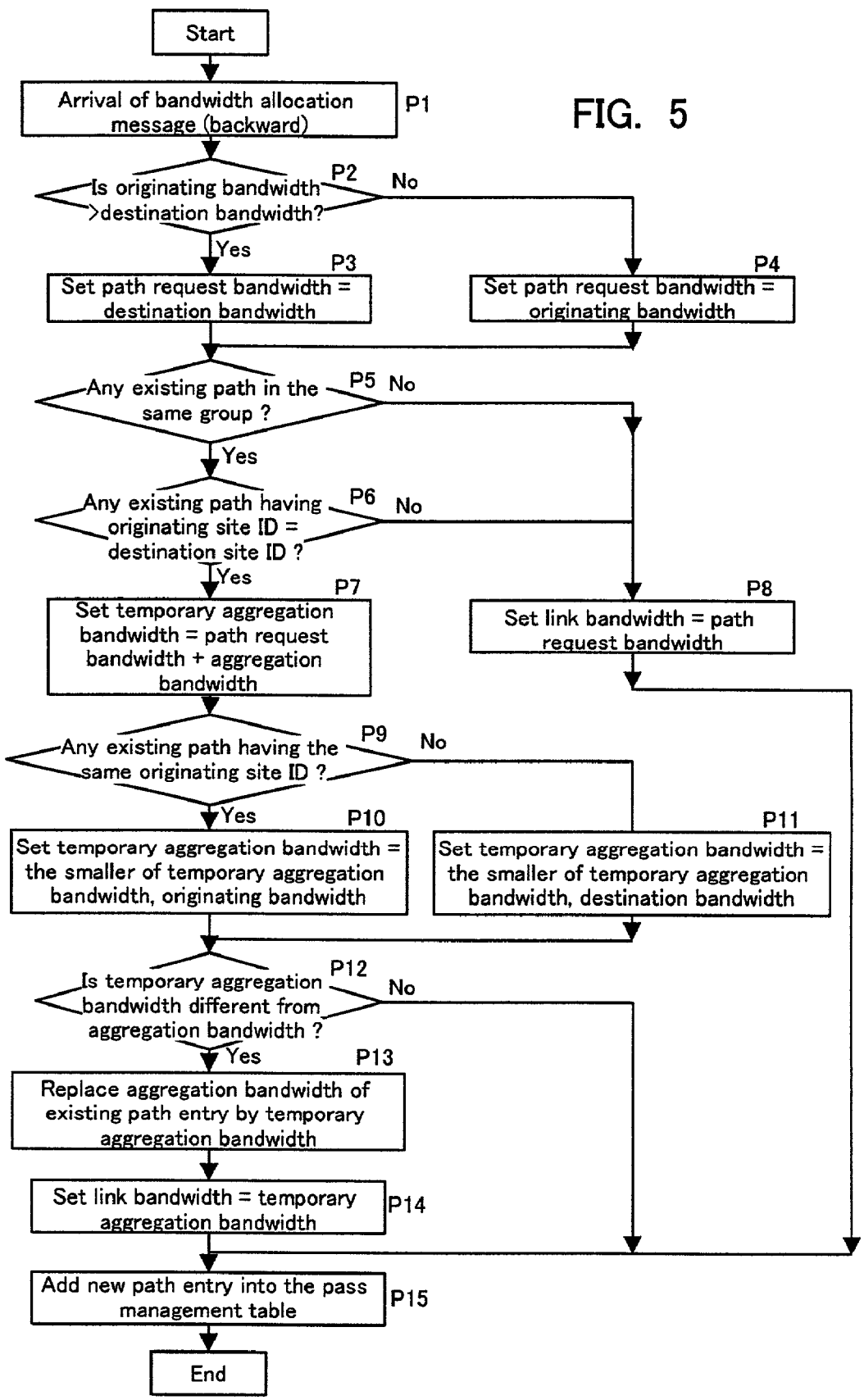
FIG. 5 shows an operation flowchart indicating the procedure for bandwidth allocation.

In FIG. 5, when a node receives a bandwidth allocation message from the other node (procedure P1), the node compares the originating bandwidth (5 Mbps in this example) with the destination bandwidth (4 Mbps) (procedure P2).

With this comparison, the one access line bandwidth which has smaller bandwidth of the two, the originating bandwidth and destination bandwidth, is selected to determine as a "path request bandwidth" (procedure P3 or P4). In this example in FIG. 3, the originating bandwidth is greater than the destination bandwidth, therefore the destination bandwidth is determined as the path request bandwidth (procedure P3).

Then, a path having the same originating site ID or destination site ID is searched out of the existing paths belonging to the same group ID (procedure P5 and P6). When the same ID is found ('Yes' in procedure P5 and P6), then the procedure progresses to the next procedure P7.

On the other hand, when the same ID is not found ('No' in procedure P5 or P6), "path request bandwidth" is determined as the link bandwidth (procedure P8).

In procedure P7, the sum of the bandwidth possessed by the existing path (aggregation bandwidth) and the path request bandwidth is determined as a temporary aggregation bandwidth.

Further, when the same originating site ID is found in existing paths ('Yes' in procedure P9), the temporary aggregation bandwidth is compared with the originating bandwidth (procedure P10). When the same destination site ID is found in existing paths ('No' in procedure P9), the temporary aggregation bandwidth is compared with the destination bandwidth (procedure P11). In either case, the smaller bandwidth is newly set as an updated temporary aggregation bandwidth.

The updated temporary aggregation bandwidth and the original aggregation bandwidth are compared (procedure P12). When they differ ('Yes' in procedure P12), the aggregation path ID of the existing paths is searched. Then the aggregation bandwidth of the whole existing paths having this aggregation path ID is replaced by the temporary aggregation bandwidth (procedure P13). Thus a link bandwidth becomes the temporary aggregation bandwidth (procedure P14).

On the other hand, when the temporary bandwidth is equal to the aggregation bandwidth, no operation is performed ('No' in procedure P12).

Then, a new path entry is added into the path management table (procedure P16), and the process is completed.

The path entry into the path management table is constituted by the following information elements: aggregation path ID, aggregation bandwidth, group ID included in the message, originating site ID, originating bandwidth, destination site ID, and destination bandwidth. Here, when the path of interest was unable to be aggregated onto either of the existing paths, a new aggregation path ID is obtained. Otherwise, when the path was able to be aggregated onto any existing path, the aggregation path ID of the existing path is used as a new aggregation path ID.

Referring back to FIG. 3, in node LER7, the line bandwidth of the destination side of 4 Mbps included in the message from LER2 is compared with the line bandwidth of the originating side of 5 Mbps (procedure P2). Then the smaller bandwidth, that is 4 Mbps, is selected (procedure P3).

Further, in procedure P5, a new aggregation path ID of '0001' is obtained because there is no existing path. Also, the aggregation bandwidth of 4 Mbps and the other information elements are filled based on the information contained in the message, to add a new entry into the path management table shown in FIG. 4A (procedure P15).

On completion of the processing in LER7, the message is forwarded to LSR6. The same process as mentioned above is carried out in LSR6 and in LSR1. Thus the path establishment is completed.

[Path Establishment from Site A to Site C]

In order to establish a path from site A to site C, an LDP message is transmitted from LER1 to LER3. As information related to site A, the similar information is stored in this message. Then the message is transmitted back from LER3.

Here, in LSR7, a bandwidth is allocated for a link to LSR3, of which algorithm is virtually the same as described previously (procedure P2, P3 and P4 in FIG. 5). Thus a bandwidth of 3 Mbps is allocated.

Then the message is transmitted to LSR6. In this case, however, the processing related to site B is different from the aforementioned processing of site A, because an entry of an existing path has already been produced (FIG. 4A).

Namely, because there already exists an entry having the same site ID (=A) having an aggregation bandwidth of 4 Mbps, a new aggregation bandwidth of 5 Mbps is obtained through procedures P7 to P10. (Refer to 'a' in FIG. 4B.)

Moreover, because the temporary aggregation bandwidth differs from the current aggregation bandwidth, elements of the existing path entry is rewritten and a new entry is added (procedure P15 in FIG. 5). Thereafter the message is finally transmitted back to LER1 to complete the path establishment, similar to the aforementioned example. (Refer to 'b' in FIG. 4B)

[Path Establishment from Site A to Site D]

Then, in order to establish a path from site A to site D, an LDP message is transmitted from LER1 to LER4. As information related to site A, similar information to the previously explained is stored in this message. Then from LER4, the message is transmitted back.

In LER4, a bandwidth is allocated for a link to LSR7. Using the algorithm same as previously described, a bandwidth of 2 Mbps is allocated.

Then an aggregation bandwidth is calculated based on the message transmitted back to LSR7. In this case, because the calculated bandwidth of 5 Mbps is identical to the existing bandwidth, the existing path entry is not changed. Rather, a new entry is added. Thereafter the message is finally transmitted back to LER1 to complete to establish a path.

[Path Establishment from Site A to Site B]

Also, a path establishment from site A to site E is performed in a similar manner. In this case, however, a requested bandwidth from site E is 8 Mbps, while the originating bandwidth is 5 Mbps. Therefore a bandwidth between LER5 and LSR7 is limited to 5 Mbps.

Through the procedures explained above, a path establishment from site B to site E is completed. Finally the bandwidths of links between LER1 and LSR6, LSR6 and LSR7, and LSR7 and LERs (LER2 to LER5) are set as shown in FIG. 3.

Figure 6:
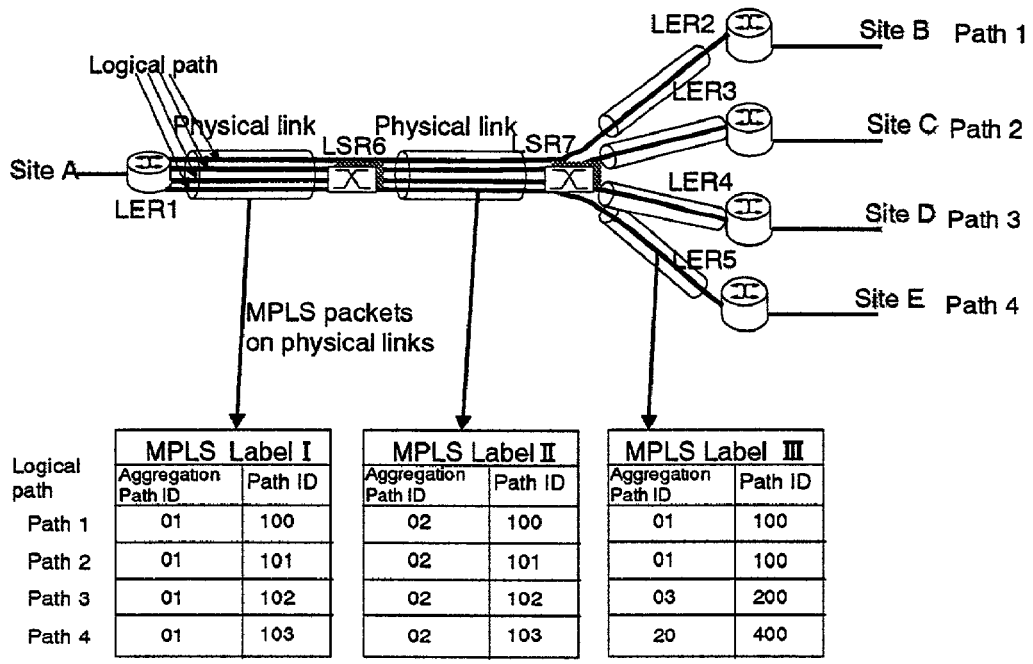
FIG. 6 shows an example of bandwidth control for an aggregated path in the embodiment shown in FIG. 3.

Now, an example of bandwidth control against the aggregation path is explained using FIG. 6 in regard to the embodiment shown in FIG. 3.

In this embodiment, paths connecting A to B, A to C, A to D and A to E are aggregated between LER1, LSR6 and LSR7. Four logical paths 1 to 4 is virtually aggregated into a single path. Bandwidth control is carried out against an upper limit bandwidth of 5 Mbps.

A principle of bandwidth control in each node such as LSR, LER and other routers constituting a network is: (1) classifying and identifying packets to be bandwidth-controlled, and (2) performing flow control (bandwidth control) against the identified packets.

As a method of (2) flow controlling against identified packets, there has been a 'leaky bucket' method widely applied today. This flow control method allows occurrence of a certain amount of burst packets and guarantees an average traffic flow.

In this embodiment, this leaky bucket method is applicable to realize the packet bandwidth control. Therefore, a method for packet identification described in above (1) is illustrated hereafter. This identification is carried out based on the information contained in a packet header. Detailed method depends on the structure of packet header.

Here a case of MPLS (multi protocol label switching) is chosen as an example. In an MPLS packet header, the managing entity can allocate each value arbitrarily at the time of path establishment. Therefore, it is possible to set an ID having a common header value locally shared by the different paths to be aggregated.

For example, a field in MPLS header to be used for identifying packets (paths) consists of 20 bits. MPLS packets transmitted using a path between A and B, and A and C, are provided with different value of Label1 and Label2, respectively, having length of 20 bits. In case the packets in concern belong to the same aggregation path, for example, the first 8 bits are allocated for identifying aggregation path, and the latter 12 bits are allocated for identifying individual paths, being used by respective LER1 to LER5, LSR6 and LSR7.

It is possible to insert aggregation path ID into the first 8 bits, and allocate an arbitrary value proper to each path for the latter 12 bits. As an example, in the case of the network configuration shown in FIG. 3, the following allocation can be given in path establishment:

As shown in FIG. 6, four logical paths 1 to 4 exist on a respective single physical link from LER1 to LSR6 and from LSR6 to LSR7. For each logical path and aggregation path, individual path IDs and aggregation path IDs are allocated.

Such values of IDs are inherently allocated to each physical link. In each LSR, label values for an incoming physical link I and for an outgoing physical link II are respectively mapped one-to-one when the path is established in LSR6 and LSR7.

The value for a link from LER1 to LSR6 is not necessarily the same as the value for a link from LSR6 to LSR7. In this example, it is assumed that the aggregation path IDs are different, while the path IDs are the same.

Aggregation path IDs from LER1 to LSR6, and from LSR6 to LSR7 respectively have the same value for path 1 to path 4. LSR6 converts the value of aggregation path ID from '01' to '02'.

The aggregated path up to LSR7 is finally separated into individual physical links from LSR7 to LER2–LER5 in which no aggregation path exists. On these links, therefore, an MPLS label value III is identified on respective LSRs and LERs. Values proper to respective physical links are applied for aggregation path IDS and path IDs.

Figure 7:
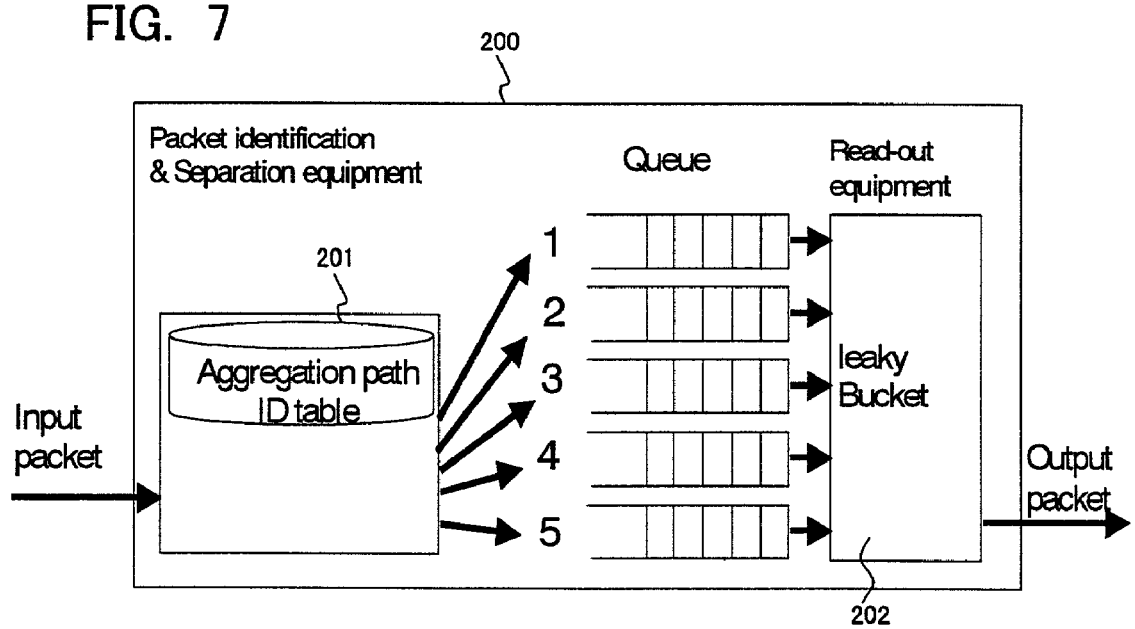
FIG. 7 shows a method of bandwidth control.

In such circumstances, the bandwidth control is carried out in a following manner. As an example in bandwidth controller provided in LSR6, the bandwidth control is carried out as illustrated in FIG. 7. This is explained hereafter.

In FIG. 7, a packet input to LSR6 is first forwarded to a packet identification & separation equipment 200, in which a bandwidth to be controlled and a queue for processing the packet are identified.

For the purpose of this identification, an aggregation path ID obtained from an aggregation path ID table 201 is used as the ID value at the time of path establishment. First the upper 8 bit in label value I of an MPLS packet is inspected. Then a packet having the same aggregation path ID, or '01' in this case, is inserted into queue 1.

A packet having an other value than the above is treated as a packet of a best-effort type for which bandwidth is not guaranteed. Namely, the packet is inserted in a best-effort queue from which the packet is read out only when no other packet exists for transmission.

In queue 1, a packet is read out with the leaky bucket method in read-out equipment 202 with a guaranteed bandwidth of 5 Mbps having been obtained through the calculation of aggregation bandwidth. Here, among parameters of the leaky bucket method, a token rate of 5 Mbps, which is the guaranteed bandwidth is sufficient, and a packet depth can be an arbitrary value.

On the other hand, a packet inserted in best-effort queue 5 is read out only when no other output packet for transmission exists in read-out equipment 202 without guaranteed bandwidth.

In case of an IP packet, different from the case of MPLS, packet header values cannot be utilized arbitrarily. In this case, the bandwidth control becomes possible by inserting a plurality of header values into a single queue, instead of inserting each header value into a corresponding single queue. Thus bandwidth control can be performed totally for aggregation paths having different header values.

[A Second Embodiment]

In FIG. 8, there is shown an example of a network configuration for illustrating a second embodiment of the present invention. In this case, a plurality of originating sites as well as a plurality of destination sites exist. The operation is as follows.

In FIG. 8, user sites A, B, C and D are provided with access lines having an upper limit speed of 5 Mbps, 4 Mbps, 3 Mbps and 2 Mbps. Each site is connected to a MPLS label switched network 100.

Site A is connected to LER1 (LER: label edge router) which is an edge node in a label switched network 100 with an access line bandwidth of 5 Mbps. As for site B to D, the situations are similar to the above-mentioned site A.

In FIG. 8, label switched network 100 is constituted by LER1 to LER4 locating at the edges, and LSR5 and LSR6 (LSR: label switch router) forming a core of the network. It is assumed that LDP (label distribution protocol) is used as a protocol for establishing an MPLS path (referred to as LSP: label switched path).

Now, when LSPs are to be established for connecting paths from site A to site C and site D, and from site B to site C and site D, it is assumed that an LSP establishment from site A to site C has started.

[Path Establishment form Site A to Site C]

In FIG. 8, a path is established from site A to site C through the procedure similar to the first embodiment. A path having a bandwidth of 3 Mbps is reserved between LER1 and LSR5, LSR5 and LSR6, and LSR6 and LER3. This reserved path is referred to as path A.

The established path is registered in a path management table shown in FIG. 9A. (Refer to 'a' in FIG. 9A.)

[Path Establishment from Site A to Site D]

Now, a path from site A to site D is established. A path having a bandwidth of 2 Mbps is reserved in a similar manner between LER1 and LSR5, LSR5 and LSR6, and LSR6 and LER4, which is referred to as path B.

Similarly, the established path is registered in the path management table shown in FIG. 9A. (Refer to 'b' in FIG. 9A.)

[Path Establishment from Site B to Site C]

Now, a path from a different originating site B to site C is to be set newly. This path is referred to as path C. Because a path oriented to the same site C already exists in accordance with the first embodiment of the invention ('a' in FIG. 9A), paths A, B and C are aggregated onto the link between LSR5 and LSR6 with the bandwidth of 5 Mbps.

Here, assuming that there occurs a communication traffic from site A to site C on path A with the bandwidth of 3 Mbps, and, substantially at the same time, a traffic to site D on path B with the bandwidth of 2 Mbps. It this fact cannot be detected at site B, it is possible for site B to initiate traffic to site C using path C with a bandwidth of 3 Mbps. Then the amount of traffic flowing into LSR5 becomes 8 Mbps in total. Therefore, in LSR5, the traffic shaping must be performed against paths A, B and C so that total traffic to LSR6 becomes 5 Mbps.

At this time, LSR simply controls to reduce the bandwidth of 8 Mbps to 5 Mbps. This reduction is caused by site A and site B simultaneously initiating traffic with a total bandwidth of 6 Mbps using path A and path B, despite the line bandwidth of site C is inherently 3 Mbps. Thus excessive traffic is input to LSR5. It is necessary to reduce the traffic of 6 Mbps to 3 Mbps.

Namely, the traffic from site A to site D through path B having the bandwidth of 2 Mbps is not to be restricted by the bandwidth control. However, a problem occurs that this control is not carried out as desired, because the three paths A, B and C are regarded equally in LSR5.

In order to solve this problem, it is necessary to construct an aggregation path group having either the same originating site or the same destination site.

Figure 10:
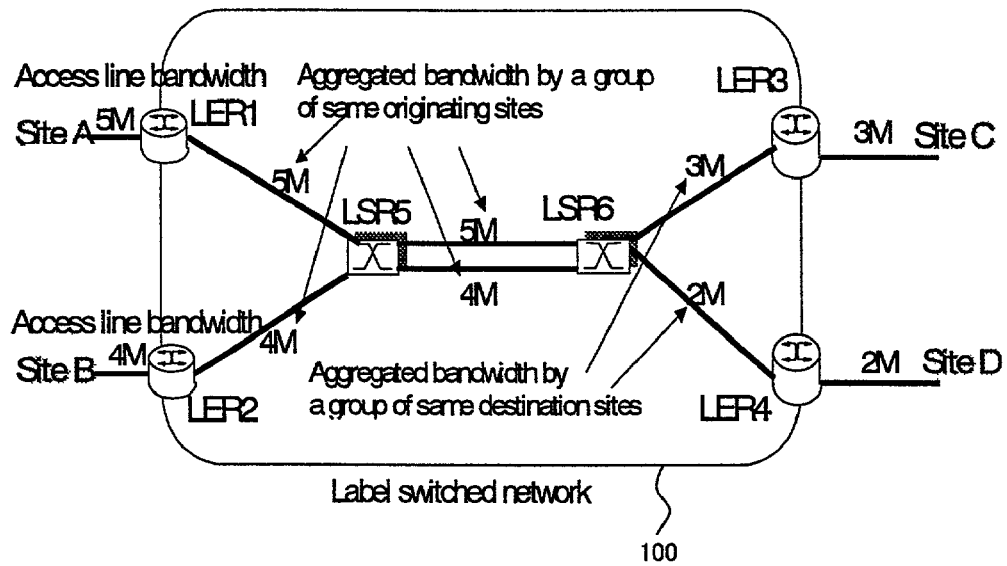
FIG. 10 shows a bandwidth establishment in case an aggregation path group having the same originating site is constituted and also the aggregation path is constituted with regard to path C on an identical originating site basis.

For example, because path A and path B already constitute an aggregation path group having the same originating site, if an aggregation path is constructed for path C having the same originating site, total bandwidth of 9 Mbps is needed between LSR5 and LSR6. This is shown in FIG. 10.

On the other hand, if a grouping is performed in respect of a destination site, an aggregation bandwidth of 5 Mbps is realized. Thus the aggregation is achieved more effectively than the case shown in FIG. 10.

As may be easily understood, the aggregation result produced from the originating site or the destination site generally depends on the sequence of the bandwidth allocation request. However, it is possible to obtain efficient aggregation bandwidth substantially at any time by comparing the bandwidth capacity of the related access lines.

Figure 12:
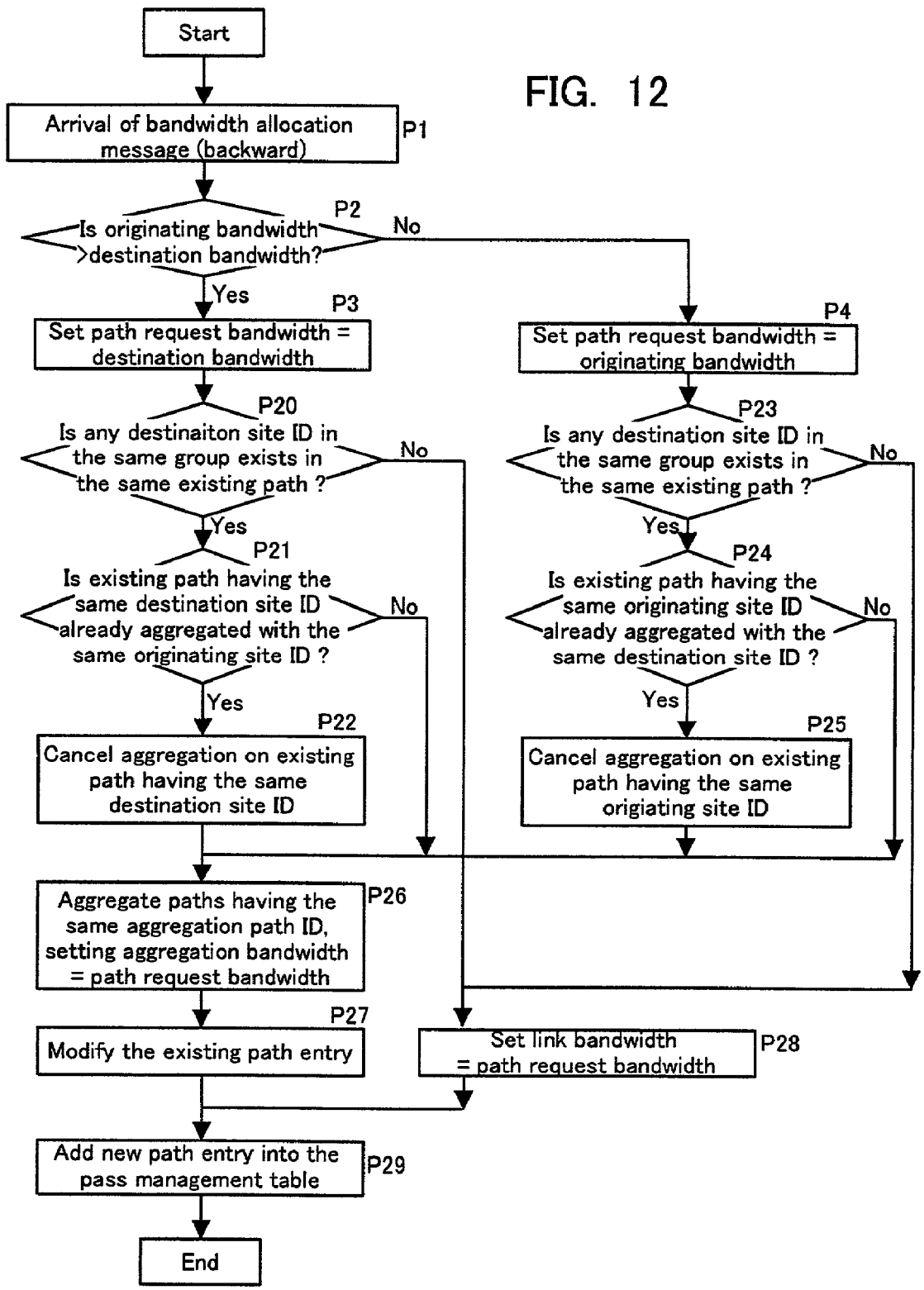
FIG. 12 shows an aggregation procedure constituting aggregation path having the same originating or destination site having small access line bandwidth.

In other words, it is generally effective if an aggregation path is so constructed that either of the originating site or destination site having a smaller access line bandwidth than the other is selected as the same site. FIG. 12 shows a flowchart illustrating a procedure of this aggregation method. Here, path C is going to be established according to this flowchart.

Comparing access line bandwidths of sites A, B and C, site C is found to have the smallest bandwidth of all. Accordingly, it is concluded that aggregation is to be carried out by selecting site C as the originating or destination site. (In this case, an aggregation path group having site C as the same destination site is constructed.)

In FIG. 12, if a destination bandwidth is set as a path request bandwidth (procedure P3), and if a destination site ID belonging to the same group exists in the same existing path (procedure P20) and also the destination site ID is aggregated with respect to the same existing path (procedure P21); or else, if an originating bandwidth is set as a path request bandwidth (procedure P4), and if a destination site ID belonging to the same group exists in the same existing path (procedure P23) and also the destination site ID is aggregated with respect to the same existing path (procedure P24); then these aggregation paths are once cancelled (procedures P22 and P25), and a new aggregation path having the same aggregation path ID is established by producing an aggregation group consisting of path A and path C (procedure P26: 'a' and 'c' in FIG. 9B). In addition, for path B, a new aggregation path ID is newly obtained ('b' in FIG. 9B).

By calculating aggregation bandwidth using the similar steps to the first embodiment shown in FIG. 5, the aimed bandwidth allocation can be obtained (procedures P27 to P29).

Figure 11:
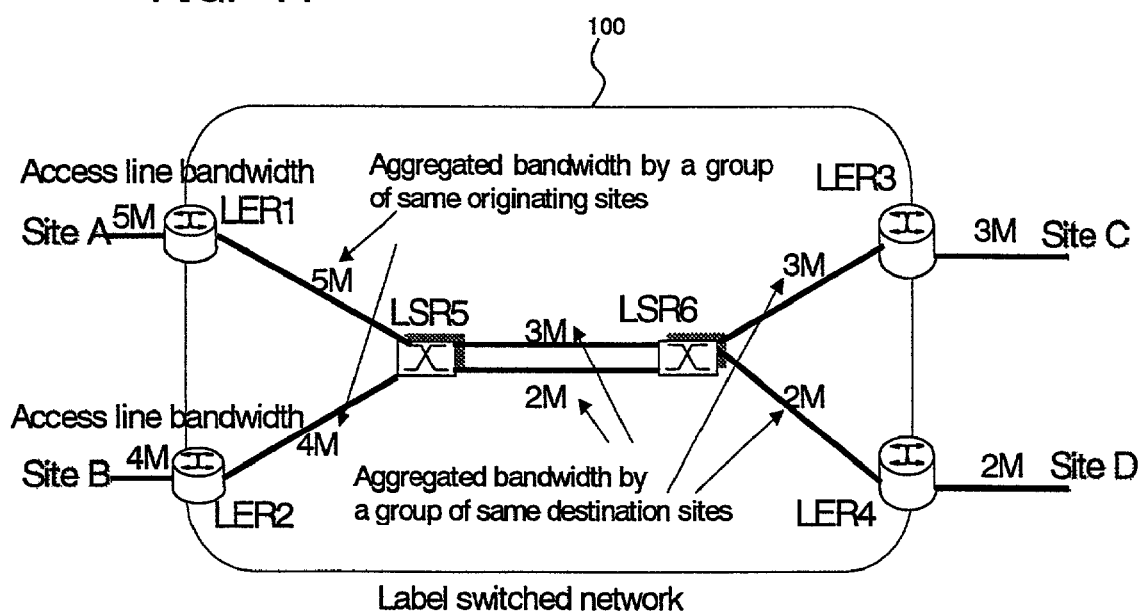
FIG. 11 shows a bandwidth establishment in case an aggregation path grouping is constituted on a destination site basis.

Finally, the bandwidth allocation is completed when path D from site B to site D is established, as shown in FIG. 11.

Now, as an extension of the aforementioned first and second embodiment, the following embodiment is also possible in accordance with the present invention.

In the first and second embodiment, each site corresponds to a host (or an internal network) owned by a user who wants to use a network for the communication between the sites. However there may also be a case that an external host or network exists outside the user's sites in the network to be used by the user.

For example, when a user is outsourcing the Internet connection function, a site necessary for the Internet connection is not provided by the user's own premise but is located elsewhere in the network. Similarly, when a user is outsourcing an application, an application server is located somewhere in the network.

In such cases, the host or network utilized by the user is virtually regarded as a site owned by the user. Bandwidths of the host or network for use by the user are virtually regarded as bandwidths of access lines of the user's site. Thus the bandwidth can be obtained similar to the first and second embodiment.

Also, when a certain site is abolished, all paths originating or destination the relevant site must be deleted. When deleting these paths, recalculation of the aggregation bandwidth is required against the other paths having the same aggregation path ID.

For this recalculation the second embodiment of the invention described above can be applied. First, it is determined from which of the destination site or originating site the aggregation is being constructed. When the aggregation is not being constructed at either site, a new aggregation is constructed among paths having the same site of either originating site or destination site.

When the aggregation was being constructed at either of the sites, it is checked whether the aggregation is being constructed at the site having smaller site bandwidth. If it is so constructed, the aggregation relation is not changed. Otherwise, if the aggregation is being constructed at the site having larger site bandwidth, the existing aggregation relation is canceled. Then a new aggregation relation is constructed using the similar method to the second embodiment, based on the site having smaller site bandwidth.

Further, as another aspect, it is probable that a site bandwidth is changed. It is possible to cope with such a case by changing the aggregation bandwidth in which the changed bandwidth is being used, when an aggregation bandwidth is the same as either the originating site bandwidth or the destination site bandwidth where the interrelation of the bandwidth size therebetween remains unchanged.

On the other hand, when the aggregation bandwidth is different form the bandwidth of either the originating or destination site, or when the interrelation of the bandwidth size between the originating bandwidth and the destination bandwidth is inverted, it is possible to cope with the bandwidth change by obtaining a new aggregation path and aggregation bandwidth from the relation to the existing path, using either the first or the second embodiment described above.

Furthermore, in the first and second embodiments, when the aggregation bandwidth having been calculated is to be reserved as a link bandwidth, there may be a case that the desired bandwidth cannot be realized because of shortage of resources. In such a case, bandwidth having been reserved presently may be used as the aggregation bandwidth, or a failure to reserve bandwidth may result in the failure of path establishment. Either of the above may be selectable.

In this case, it may be possible to insert the information that the bandwidth was not able to reserve into bandwidth allocation message. This enables the user owning the site to recognize the quality of service not guaranteed because of a bandwidth shortage.

In another case in the first or second embodiment, an access line has no effective bandwidth such that an access line bandwidth of a site is not fixed inherently, or a function of guaranteeing access line bandwidth is not provided. In such a case, there is no use allocating a bandwidth, and it merely results in waste of bandwidth resources.

Assuming that both an originating site and a destination site have no effective access line bandwidths, an aggregation path also has no effective access line bandwidth. Accordingly, a path is established merely as a best-effort class without affording a guaranteed bandwidth.

Also, when either an originating site or a destination site has no effective access line bandwidth, the method of determining an aggregation path and calculating an aggregation bandwidth according to the first or second embodiment is applied, using only the bandwidth of the site having an effective access line bandwidth. Thus an appropriate aggregation bandwidth can be established.

Moreover, in the previous embodiments, decision of whether the aggregation of each path is to be constructed, as well as calculation of the aggregation bandwidth, is carried out in each node. It is, however, also possible to provide a centralized server inside the network for performing the decision and calculation described above, to realize the bandwidth allocation similar to the above.

More specifically, in case each LER is informed of the network configuration such as topologies of each LER and LSR, in addition to the information assumed as a prerequisite of the first embodiment, a novel bandwidth allocation message is informed to an LER accommodating the originating site. This bandwidth allocation message includes an aggregation path ID by which paths to be aggregated by each LER and LSR can uniquely be determined, and the information of the aggregation bandwidth. Further, the server is provided with functions of ordering to transmit the above-mentioned message to the destination LER via transit LSR, and deciding aggregation path and calculating bandwidth in accordance with the first and second embodiments. This enables each LER and LSR to determine uniquely to which path each path for inter-site communication shall be aggregated based on the information of the aggregation path ID and the aggregation bandwidth. Thus the aggregation can be realized similar to the first and second embodiments.

Figure 13:
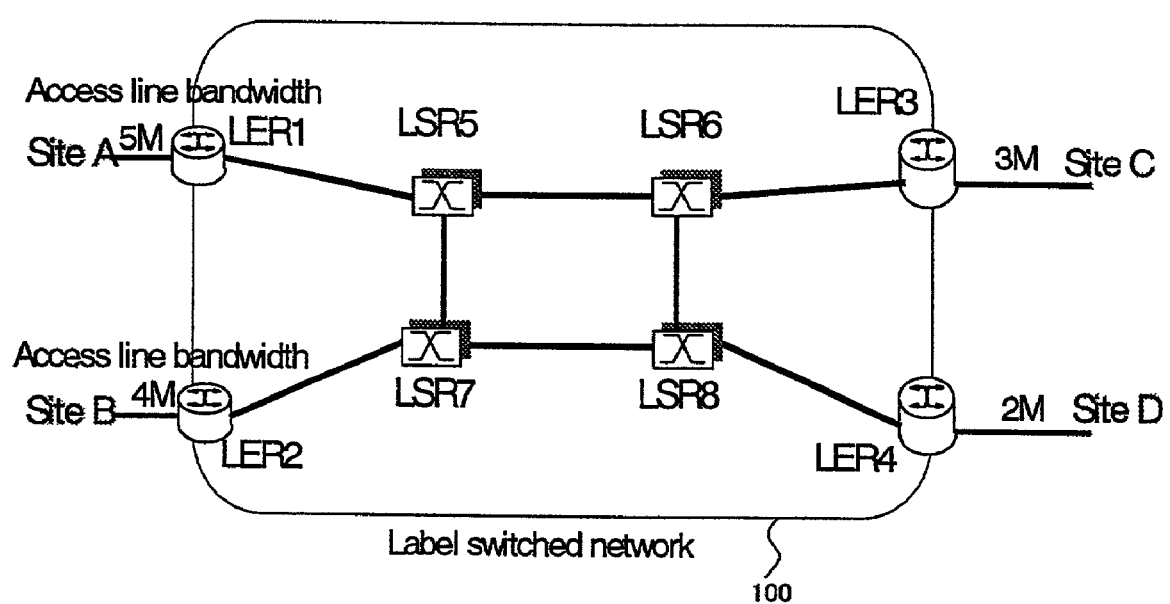
FIG. 13 shows another network configuration in the present invention.

Now, as another embodiment of the present invention, in the network configuration shown in FIG. 13, a method for obtaining aggregation bandwidth when establishing respective paths from site A or site B, to site C or site D, is considered hereafter.

According to the first and second embodiments, there is no means to specify a route in the network. Therefore path aggregation is performed with respect to a node and link where a plurality of bandwidth allocation messages arrive.

In the example of FIG. 13, there exist two paths from site A to site D; one is through LSR6 and the other is through LSR7, even when considering the shortest path. On the other hand, a path from site B to site D passes through LSR7 and LSR8 when the shortest path is to be selected.

Here, from the study of the second embodiment, the path aggregation constructed on site D as a destination site is proved to be an effective bandwidth aggregation. Therefore it is desirable that both paths from site B to site D and from site A to site D are selected through the same LSR. This is also applicable to a case that site C is considered to be a destination site.

Accordingly, the routing control is performed so that the site of either destination site or originating site having the smaller access line bandwidth is selected as the same site for the path aggregation. A server having such routing control function is provided in the network.

It is assumed that the server has the information on access line bandwidth of each site in advance, by means of communicating with each LER, or other means.

Thus when recognizing the necessity of path establishment from site A or site B to site C or site D, the server compares the access line bandwidths of respective sites in a manner to the second embodiment. The server then orders to the originating sites A and B to transmit a bandwidth allocation message indicating a path from site A or B to site C through LSR5 and LSR6, and also a path to site D through LSR6 and LSR7.

The bandwidth allocation message passes through the respective LSRs according to the order from the server. This is realized when each LSR and LER use a suitable protocol such as CR-LDP protocol commonly used in MPLS technology or RSVP protocol, which is able to designate the route explicitly. The server designates these explicit routes to an ingress LER to enable the above-mentioned function.

Having been illustrated the embodiments of the present invention, according to the invention, it is possible to save resources to be used for bandwidth reservation in a network providing inter-site communications, compared with the conventional method of bandwidth reservation performed on a path by path basis where the aggregation is not considered.

It is to be noted that any suitable modification and equivalents to the embodiment of the present invention described hitherto may be resorted to the scope of the invention. All features and advantages of the invention which fall within the scope of the invention are covered by the appended claims.

What is claimed is:

1. A method of allocating an aggregation bandwidth in a network system; said network system comprising an inter-site connection network of a plurality of nodes respectively having packet switches, and a plurality of user sites each respectively having at least one of: a host or a network connected to said plurality of nodes through access lines, said method comprising the steps of:

when a first user site of interest among said plurality of user sites is to be connected to a second user site among said plurality of user sites through said inter-site connection network, said first user site being connected to said inter-site connection network via a first access line, said second user site being connected to said inter-site connection network via a second access line, setting a path request bandwidth as the least of bandwidth of said first access line and bandwidth of said second access line;

calculating a new aggregation bandwidth of a path interconnecting said first user site of interest and said second user site based on bandwidth parameters, said bandwidth parameters comprising said path request bandwidth, a first aggregation bandwidth of an existing path connecting of said first user site and said second user site as a connecting user site, and access line bandwidth of said connecting user site; and allocating said new aggregation bandwidth to said plurality of nodes.

2. The method for allocating network aggregation bandwidth according to claim 1, wherein, among a plurality of paths interconnecting said plurality of user sites, if it is possible to aggregate a plurality of paths, said plurality of paths are aggregated with respect to a user site within said plurality of user sites having the least access line bandwidth among access line bandwidths corresponding to each of said plurality of user sites.

3. The method for allocating network aggregation bandwidth according to claim 1, wherein, when a virtual site having a host or a gateway to another network used by either of: said first or said second user site is connected to said inter-site connection network, bandwidth allocation is based on said virtual site regarded as at least one of: said first and said second user sites.

4. The method for allocating network aggregation bandwidth according to claim 1,
wherein when said at least one of first and second user sites becomes nonexistent, a path related thereto is deleted, and whether the aggregation path for other paths having the same aggregation path ID as said deleted path has been constructed at the destination site or the originating site is investigated; and if the aggregation path has not been constructed, a new aggregation relation is established among paths having either the same destination site or the same originating site; else if the aggregation path has been constructed at either the destination site or originating site having a larger site bandwidth, then the existing aggregation relation is canceled to obtain a new aggregation bandwidth based on a site having a smaller bandwidth.

5. The method for allocating network aggregation bandwidth according to claim 1,
wherein, when either of: said first or said second access line bandwidth is either increased or decreased producing an aggregation bandwidth that results in an inverted interrelation between bandwidths corresponding to said originating and said destination site, an aggregation path and said aggregation bandwidth are re-calculated.

6. The method for allocating network aggregation bandwidth according to claim 1, further comprising the steps of:
in a server provided in said inter-site connection network, calculating an aggregation path and said new aggregation bandwidth; and
when bandwidth is available for reservation in said inter-site connection network, transmitting to each transit node indication information of an aggregation path included in a bandwidth allocation message to be transmitted in forward or backward direction.

7. The method for allocating network aggregation bandwidth according to claim 6, further comprising the step of:
in the server, specifying a transit node or transit nodes through which said bandwidth allocation message is transferred.

8. A network system comprising:
an inter-site connection network including a plurality of nodes each having a packet switch, and
a plurality of user sites each comprising at least one of: a host and a network, being connected to each node through an access line,
wherein when a first user site of interest among said plurality of user sites is connected to a second user site among said plurality of user sites through said inter-site connection network, said first user site being connected to said inter-site connection network via a first access line, said second user site being connected to said inter-site connection network via a second access line, the smaller amount of bandwidth of said first access line and said second access line is regarded as a path request bandwidth;
a new aggregation bandwidth of a path interconnecting said first user site of interest to said second user site based on bandwidth parameters, said bandwidth parameters including said path request bandwidth, the aggregation bandwidth of an existing path having one of said first user site and said second user site as a connecting user site, and the access line bandwidth of said connecting user site; and
said new aggregation bandwidth is allocated to said plurality of nodes.

9. The network system according to claim 8, further comprising:
a server, which is provided in said inter-site connection network, for calculating the aggregation path and the new aggregation bandwidth, and for when bandwidth resource possible to reserve exists in said inter-site connection network, transmitting to each transit node an indication information of an aggregation path included in a bandwidth allocation message to be transmitted in forward or backward direction.

* * * * *